United States Patent
Brown et al.

(10) Patent No.: US 6,631,363 B1
(45) Date of Patent: Oct. 7, 2003

(54) RULES-BASED NOTIFICATION SYSTEM

(75) Inventors: Daniel Brown, Austin, TX (US); William Lance Eason, Austin, TX (US); George A. Thompson, Austin, TX (US)

(73) Assignee: i2 Technologies US, Inc., Dallas, TX (US)

( * ) Notice: Subject to any disclaimer, the term of this patent is extended or adjusted under 35 U.S.C. 154(b) by 122 days.

(21) Appl. No.: 09/686,446

(22) Filed: Oct. 10, 2000

Related U.S. Application Data (60) Provisional application No. 60/158,732, filed on Oct. 11, 1999.

(51) Int. Cl.[7] ................................................. G06F 17/30
(52) U.S. Cl. .................. 707/1; 709/223; 709/224; 709/225; 370/401; 707/2; 707/3; 707/4
(58) Field of Search ................................. 707/1, 2, 3, 4, 707/56; 709/223, 224, 225, 201; 370/401; 455/404, 445; 358/400–405, 407–428, 434, 435–442, 444

(56) References Cited

U.S. PATENT DOCUMENTS

| | | | |
|---|---|---|---|
| 5,430,875 A | | 7/1995 | Ma ............................ 395/650 |
| 5,701,484 A | * | 12/1997 | Artsy ......................... 709/202 |
| 5,721,825 A | | 2/1998 | Lawson et al. ........ 395/200.33 |
| 5,751,914 A | | 5/1998 | Coley et al. ................... 395/51 |
| 5,933,604 A | | 8/1999 | Inakoshi ................ 395/200.56 |
| 5,978,836 A | * | 11/1999 | Ouchi ......................... 709/223 |
| 6,128,640 A | * | 10/2000 | Kleinman ................... 709/102 |
| 6,212,511 B1 | * | 4/2001 | Fisher et al. ................... 707/1 |

FOREIGN PATENT DOCUMENTS

| | | |
|---|---|---|
| EP | 0 537 098 A2 | 4/1993 |
| EP | 0 759 591 A1 | 2/1997 |

OTHER PUBLICATIONS

PCT Search Report, Jul. 13, 2001.

* cited by examiner

*Primary Examiner*—Kim Vu
*Assistant Examiner*—Isaac Woo
(74) *Attorney, Agent, or Firm*—Baker Botts L.L.P.

(57) ABSTRACT

A system and method for providing notifications to a user includes an alert manager. The alert manager receives notifications of events occurring within various executing applications, and utilizes rules to determine when alert notifications should be sent to one or more specified users. In addition, operation of batch jobs can determine changes in state of selected data, which generate events for the alert manager in addition to those generated directly by an executing application. Alert notifications to users can be sent to the user via any of several communications channels.

36 Claims, 3 Drawing Sheets

RULES-BASED NOTIFICATION SYSTEM

CROSS-REFERENCE TO RELATED APPLICATION

This application claims the benefit of U.S. Provisional Application No. 60/158,732, filed Oct. 11, 1999. This application also contains matter in common with copending U.S. application Ser. No. 09/686,442, filed on even date herewith, titled CUSTOMIZABLE USER WINDOW, which is incorporated by reference.

BACKGROUND OF THE INVENTION

1. Field of the Invention

The present invention relates generally to communications for electronic computer systems, and more specifically to a system and method for notifying a user that selected events have occurred within the system.

2. Description of the Prior Art

As computer systems and data communications become increasingly widespread, more and more users are able to perform a high percentage of their daily tasks over various communication networks. For example, many users are able to obtain-key information in a timely manner through the use of interconnected software and hardware systems.

Because of the great wealth of information available, it often becomes time consuming for a user to keep up with items and events of interest. In some cases, a dedicated window may be included on a user's desktop to provide information about high priority items. For example, a streaming stock quote ticker may be resident on a user's desktop to enable them to keep up with selected stock market information. However, the number and variety of sources of potentially interesting information is so large that this type of dedicated approach can work for only a small number of sources.

Often, a user is required to access a database or other source of information in order to determine whether an event of interest has occurred. This can be relatively time consuming, and often results in undesirable delays if the user is unable to check the required sources often enough.

Another approach is to automatically send notifications directly from an application to a user when selected events occur. This requires coding of the necessary handling and routing modules within the application. This can become a significant burden from the application writer's standpoint, and can lead to inconsistencies in the way message notifications are presented to users.

It would be desirable to provide a system and method for automatically notifying users upon the occurrence of selected events. It would further be desirable for such notification system to be able to handle different types of events and present notifications to users in different ways.

SUMMARY OF THE INVENTION

In accordance with the present invention, a system and method for providing notifications to a user includes an alert manager. The alert manager receives notifications of events incurring within various executing applications, and utilizes rules to determine when alert notifications should be sent to one or more specified users. In addition, operation of batch jobs can determine changes in state of selected data, which generate events for the alert manager in addition to those generated directly by an executing application. Alert notifications to users can be sent to the user via any of several communications channels.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DESCRIPTION OF THE PREFERRED EMBODIMENT

As will be understood by those skilled in the art, the present system and method can be used with nearly any computer system in which events occur during execution of an application, or in which data is changed. In the preferred embodiment, the operating applications are of a type which generate messages indicating the occurrence of selected events. However, as described below, the system will also work with applications which do not generate such events, and is adaptable to nearly any type of computer application.

Figure 1:
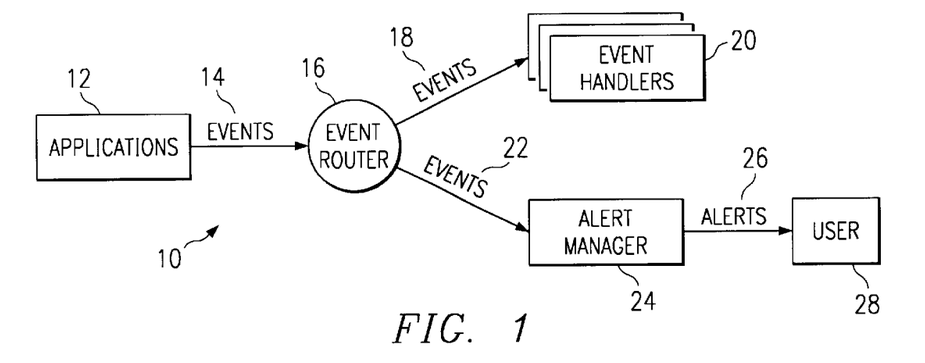
FIG. 1 is a high-level block diagram of a system in accordance with the present invention.

Referring to FIG. 1, a preferred embodiment of the inventive system and method is illustrated generally as reference number 10. A plurality of applications 12 operate concurrently, and may be located on a single piece of hardware, or spread among numerous machines. The applications 12 need not operate in conjunction with one another, but may be a wide variety of selected applications, of any type, which perform data processing functions.

As will be described in more detail in connection with FIG. 2, applications 12 generate events 14, which are forwarded to an event router 16. Events 14 are basically messages indicating that some type of predetermined event has occurred. As defined further in connection with FIG. 2, these messages may be generated directly by applications to indicate that an event has occurred in that application. For example, an application which is used to change the price of a product in a database can generate an event message indicating the product number and new price for the product. In addition, as described below, certain types of applications 12 may periodically scan persistent information, such as that stored in databases, to determine whether data has changed. These applications can also generate events showing that changes of the selected type have occurred.

Event router 16 is described in more detail in connection with FIG. 4, but is generally an application which receives incoming events 14, and routes them to recipients which have registered to receive events of this type. For example, if a user or another application has registered to receive notification of price change events, the event router 16 will maintain this information. When an incoming price change event is received by event router 16, it will then be forwarded to all applications which have been registered to receive this event.

Event router 16 therefore acts as a central routing point for messages. It is not necessary for applications 12 to know, or be able to find out, who will receive notifications of events. Instead, applications 12 simply generate defined events and send all of them to event router 16. Event router 16 handles the task of sending the events to as many recipients as are registered to receive them.

Some events 18 are routed to various types of event handlers 20, which then use the incoming event message to process data. In many cases, event handlers 20 will also be classified as applications 12. In this application, event handlers 20 are generally any applications which make some use of the information provided by incoming event messages 18.

Some events 22 are routed to an alert manger 24, which is a particular type of event handler. As described further in connection with the remaining figures, alert manager 24 handlers incoming events by determining whether any incoming event requires that a notification, or alert 26, is to be forwarded to a user 28. Alert manager 24 utilizes a set of rules to determine to whom, and when, notifications should be made to a user 28.

Figure 2:
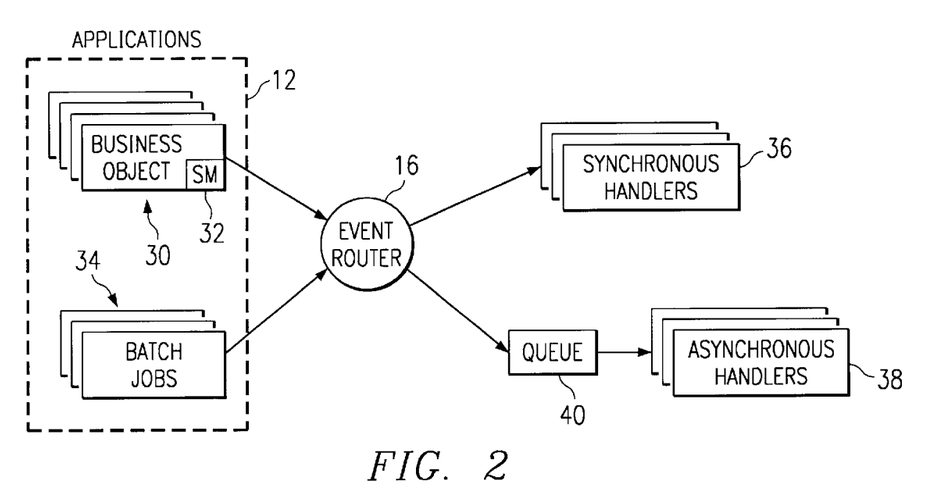
FIG. 2 is a block diagram indicating additional details of the system of FIG. 1.

Referring to FIG. 2, the types of applications 12 which generate events may be classified generally into two categories. The first category is referred to herein as business objects 30, which may include within them state machines 32 and similar operating modules. Business objects 30 generate "explicit" events, meaning that the code of the business object application explicitly generates an event to be sent to event router 16 as events occur. This capability must be programmed into business objects 30 and their state machines 32.

Explicit events are useful, in the present invention, for indicating when a single event has occurred. For example, when a sale is made, or a product changes price, or a new product becomes available, if the corresponding business objects are properly programmed events will be generated. These can be picked up by alert manager 24, and used to generate notifications.

A second kind of application that can generate events is referred to herein generally as "batch jobs." These jobs are applications that, generally, periodically check persistent data, such as data stored in a database, and look for changes that may have occurred. For example, if an application which enters new products into a database is not one which has previously been coded as a business object, to generate explicit events on this occurrence, a batch job 34 can periodically scan a product database and determine when new products have been added. Events which are discovered by such a comparison between a previous state of an object, in a persistent memory, with the current state are referred to herein as "implicit events."

Use of batch jobs to scan data looking for implicit events is useful both for events which occur over time, and for use with applications which are not already coded to generate the desired explicit events.

Event router 16 can route events to two different types of handlers. These can be categorized generally as synchronous handlers 36 and asynchronous handlers 38. Events which are intended for use by asynchronous handlers are preferably placed into a queue 40, from which they are later withdrawn by various asynchronous handlers 38. More than one queue 40 can be provided, and registration of a handler with the event router, to be notified of a particular type of event, will indicate whether the handler is synchronous, or asynchronous, and in the later case indicate which queue is used for the event message.

Figure 3A:
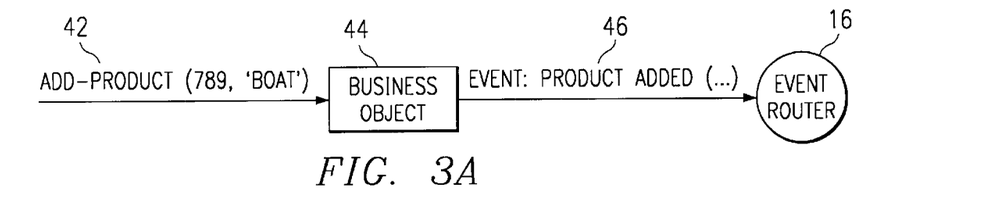
FIGS. 3A and 3B illustrate operation of different types of event generation techniques.
Figure 3B:
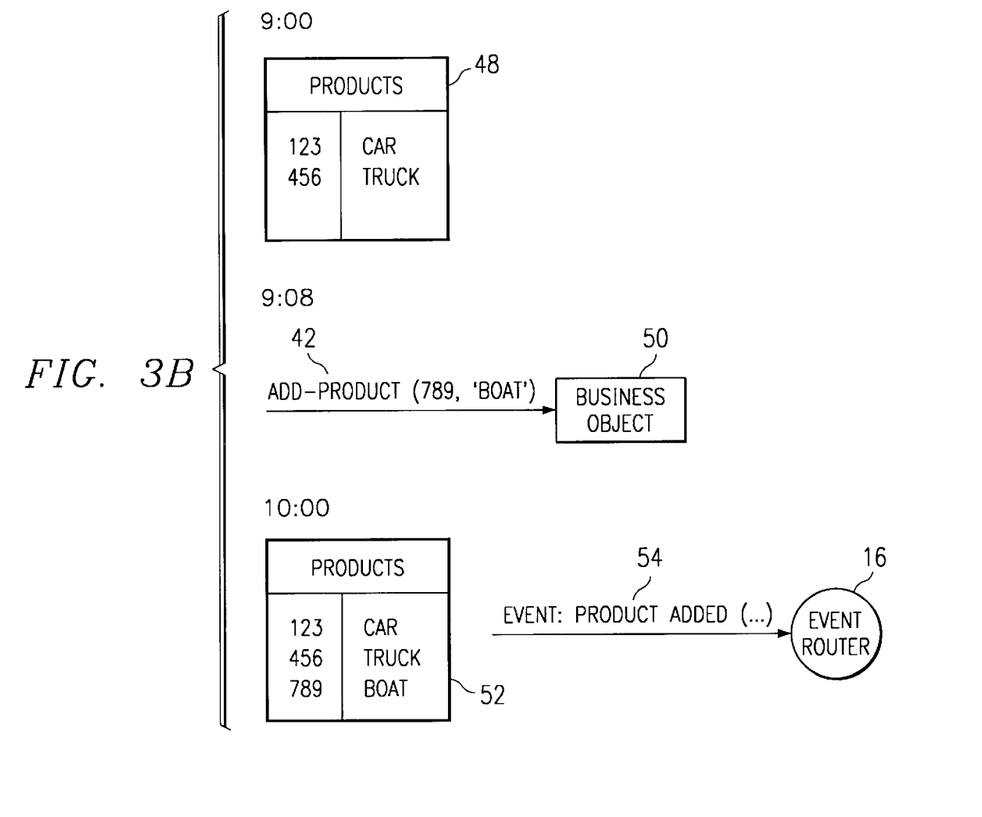

FIGS. 3A and 3B illustrate the operational difference between explicit and implicit events. In FIG. 3A, dataflow occurring upon an explicit event is shown. In this example, a user running an application enters a new product, number 789, and identified as a "BOAT", into the system.

When the user desires to add the product, procedure add-product is executed 42. This procedure passes the new product number, '789', and the new item description, 'BOAT', to business object 44. When the new product is set up by business object 44, an event 46 is generated and sent to event router 16. Event 46 indicates that a new product has been added, and passes the relevant parameters as part of the message.

Referring to FIG. 3B, addition of the same product is illustrated when no business object is available to generate an explicit event. Instead, it will be assumed that an appropriate batch object 34 runs periodically to check a persistent data base. In this example, the batch job runs at 9:00 o'clock, and detects a table in the data base which shows two products, numbers 123 and 456. This information is retained by the batch object for future use. At a subsequent time, 9:08 in this example, a user executes the add-product procedure as was the case in FIG. 3A. However, business object 50 is one which does not generate an explicit event message when the data base is updated. Thus, no message is sent to event router 16 at 9:08.

At 10:00, in this example, the batch job executes again. At this time, the information it collects is shown in table 52 and includes three products. By comparing the present table 52 with earlier table 48, the batch job determines that a new product has been added to the data base. The batch job then generates an implicit event showing that the new product has been added, and sends it to router 16.

Depending upon the implementation, it may be desirable for implicit events to carry a flag distinguishing them from explicit events to assist either the router or handler in determining how to treat the message. However, in other cases, it may not be necessary to distinguish between implicit and explicit events; only the fact that an event occurs would be of interest to the handlers.

Figure 4:
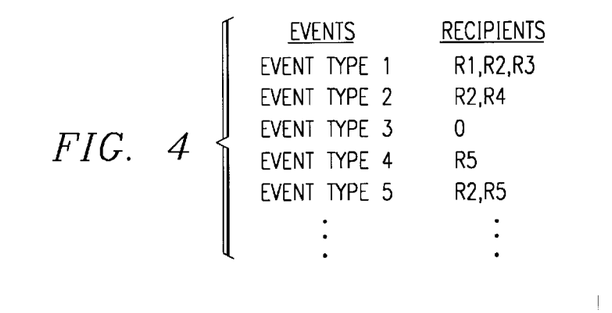
FIG. 4 shows the type of information maintained by an event router in accordance with the present invention.

FIG. 4 indicates the type of information retained by event router 16 in order to route events which it receives. The information is shown in FIG. 4 as a table, but may be stored internally within event router 16 in any desirable form.

Referring to FIG. 4, the table indicates that event router 16 stores a list of types of events which are to be routed. This table is preferably dynamic, and can be added to as various handlers register with event router 16. In the example of FIG. 4, EVENT TYPE 1 has three recipients, R1, R2 and R3, registered to receive a copy of this type of event. Thus, when an event of EVENT TYPE 1 is received by event router 16, recipients R1, R2 and R3 in turn receive a copy of the event message. Identification of the recipient indicates where the message will be sent, and any other particular conditions under which it should be forwarded. If any recipients R1, R2 or R3 are synchronous handlers, the event message will be copied and forwarded to them immediately. If any of these recipients are asynchronous events, the registration of such event will indicate a queue into which a copy of the event message should be placed.

FIG. 4 shows five different event types, with various recipients registered to receive them. Some event types, such as EVENT TYPE 3 in this case, may not have any registered recipients. In such case, any events of this type are not routed to a handler. In most cases, however, one or more recipients will be registered to receive an event, and event router 16 will forward copies of the event message to all registered recipients.

By use of the event router, recipients can register to receive messages of various types without having any impact on the business objects which generate these events. Instead, the events are consistently passed to event router 16, from which any handler which needs to be copied on the event message receives its forwarded copy. Each handler will then deal with a message according to its internal logic.

Figure 5:
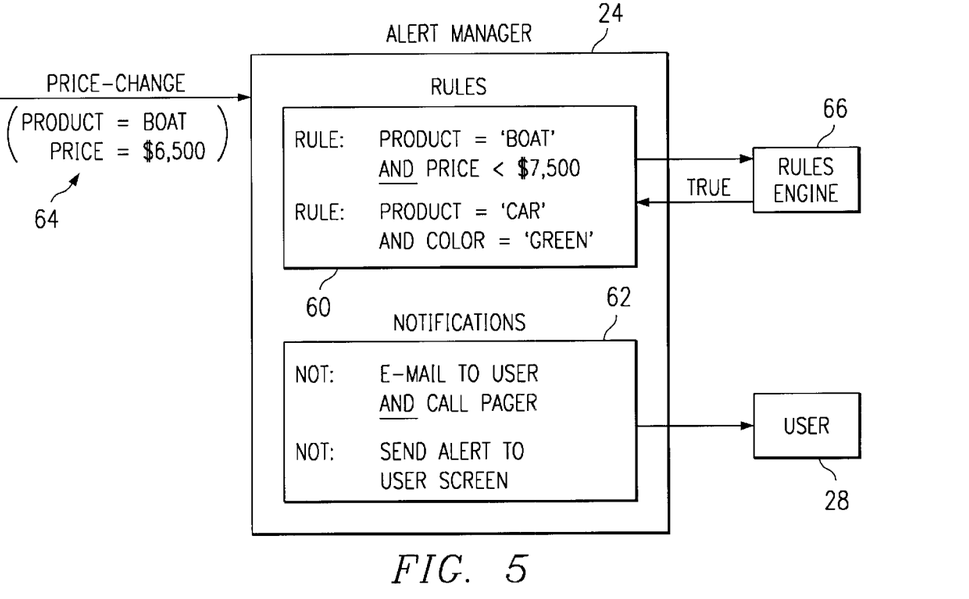
FIG. 5 is a block diagram illustrating an operation of an alert manager.

FIG. 5 is a block diagram illustrating functioning of the alert manager 24. As described above, alert manager 24 is preferably an asynchronous handler and therefore receives its events from a queue.

Within alert manager 24 are two major portions. These include a rules portion 60, and a notifications portion 62. Rules portions 60 contains a large number of rules defining when events are to be acted upon. Each user who desires to receive alert notifications from alert manager 24 will register with the alert manager, and define the conditions under which that user wishes to receive a notification. Rules are generally conditional statements which define where the notification is to be generated.

In the example shown in FIG. 5, two rules are provided. The conditional for the first rule provides that a product equals ("BOAT"), and a price less than $7,500.00. If an event occurs which makes this conditional TRUE, a corresponding notification 62 will be generated to the user requesting this alert.

In this example, a price-change event 64 is passed to alert manager 24 by its associated queue, the rules portion 60 compares the context data passed along with the message with its rule conditional portions. The comparisons are performed by a rules engine 66, which receives rules and context data from rules portion 62 and returns Boolean values of true or false depending upon the evaluation of the conditional. In this example, rules engine 66 returns a value of TRUE for the first rule, because the product is "BOAT" and the price is less than $7,500.00.

When the condition of a rule is satisfied, the corresponding notification is then executed and sent to the user 28. Notifications can involve sending a message by a computer communications network to a user's desktop. Notifications can also include sending of a message via phone, pager, fax, or any other desired technique. The contents of the message are defined by the notification portion of the rule. Preferably, a fairly large number of preselected message types will be available, so that a user will be able to select from these messages. The messages can include textual information, and can include as parameters some or all of the context information included with event 64. In-the example of FIG. 5, an e-mail message can be sent to the user who registered Rule 1 indicating that a price change for BOAT has occurred, and indicating the new price for the BOAT. A call can be made to a pager at the same time; any desired number of notifications can be made.

This rule base system allows users to register with the alert manager 24, defining logical conditions under which alerts of various types will be sent. This frees the user from having to check for events or changed conditions individually; this is done automatically by the rules set up in the alert manager. Users can determine how these messages are to be sent. E-mail would be one typical type of message; users may also provide for one or more notification windows to be generated upon their desktop for the sole purpose of receiving alert notifications.

By setting up and registering different types of alerts with a central system, a user can be notified regarding a wide variety of events which would otherwise take too much time and effort to profitably be viewed. Upon receiving one of these alerts, the user can, if she so desires, take a corresponding action.

Figure 6A:
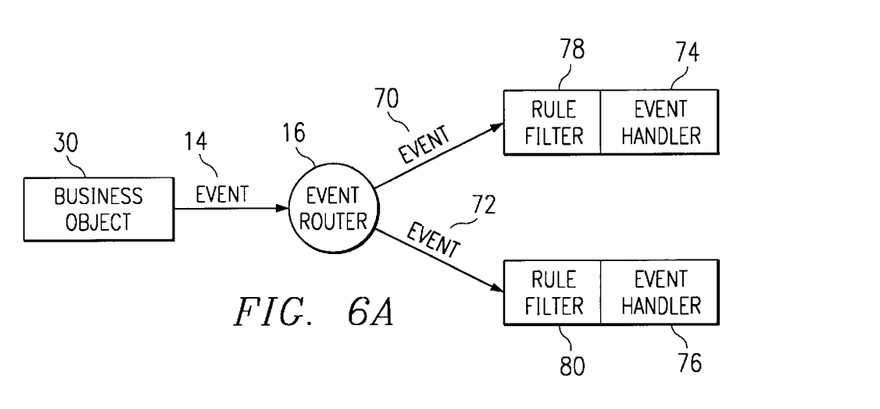
FIG. 6A illustrates one preferred embodiment for using a rule filter with event handlers.

The method described above can be generalized and modified to provide different functionality. Referring to FIG. 6A, a diagram is shown of a system which uses a rule filter similar to the rules portion of an alert manager 24 for event handlers in general. When business object 30 generates an event 14, it is communicated to event router 16. Event router 16 then sends copies of event 70, 72 to event handlers 74 and 76 which have been previously registered with event router 16. Event handlers 74, 76 each have a rule filter 78, 80, respectively, which uses conditionals in essentially the same manner as described in connection with FIG. 5. These rule filters allow for initial filtering of events by event handlers 74, 76 as part of the determination of which events to respond to.

Figure 6B:
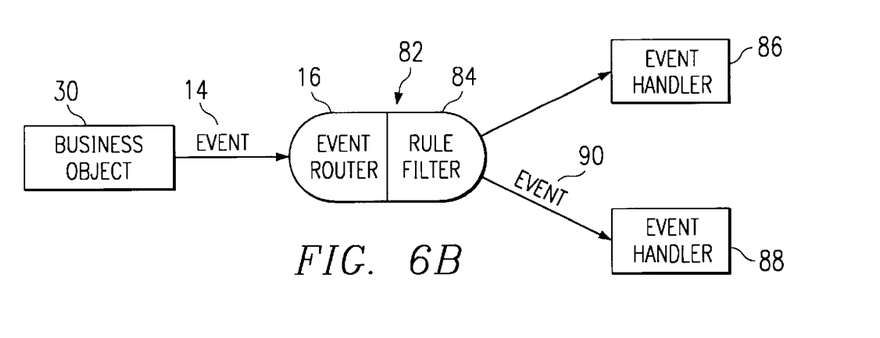
FIG. 6B illustrates an alternative embodiment for using a rule filter with event handlers.

An alternative approach is shown in FIG. 6B, in which a combined router/filter 82 includes event router 16 and rule filter 84. When business object 30 sends an event 14 to event router 16, rule filter 84 is checked to see whether any rules apply to such event. If a conditional of a rule is met, the functional portion of the rule, directing events to particular handlers, is then executed. For example, when event 14 is sent to event router 16, the corresponding copy is not automatically sent to both event handlers 86, 88. Instead, the context data included with event 14 is evaluated as described in connection with FIG. 5 within rule filter 84, and events are only sent to handlers for which the rule conditional evaluates true. In this example, event copy 90 is forwarded only to event handler 88 because no corresponding conditional was satisfied which would cause event 14 to be routed to event handler 86.

Inclusion of rule filter 84 with event handler 16 allows for several changes in the system. Initially, router/filter 82 must be more complicated, and allow handlers to register rules with filter 84 as well as simply being added to a list in event router 16. Preferably, rules in filter 84 are checked only for handlers which are registered for a particular event type, so that only a few rules need to be checked when an incoming event is received.

Inclusion of rule filter 84 with event router 16 increases the complexity of the code associated with the event router, but decreases communications to event handlers. Only events which satisfy a predefined criteria are passed to an event handler by rule filter 84. In addition to lessening network traffic, this approach simplifies all of the event handlers. Each event handler may be simplified by deleting any initial rule filter used to handle incoming events; instead, this filtering is performed by rules registered with rule filter 84.

The system and method described above provide a simplified method for generating user alerts in response to various events taking place within applications. By sending all events to a central location, an alert manager can register for any desired type of event and, in response to logical conditionals being satisfied, send alert notifications to any registered users. Because the system can handle both explicit and implicit events, it is suitable for use with existing applications which do not generate events suitable for routing through event router 16, or which do not generate events of interest to a particular user.

Users gain the ability to select types of events for which they wish to be notified. When these events occur, notification occurs automatically. The user need not periodically review various locations to determine whether anything has happened. Users can select from among types of events, and the applications writers can determine which events to actually make available. For example, a user can register with the alert manager 24 to be notified whenever a new product is introduced by a competitor; automatic notification's will be provided whenever this occurs, assuming the events are available as either explicit or implicit events.

Preferably, users will be able to select from one or more menus of choices provided by the system. This simplifies the task of registering to receive alerts, and ensures a certain uniformity of notifications across all users. The conditionals used in the alert rules can be provided as templates, with the user selecting the form of the conditional and any particular values to be used. In this manner, the user can easily provide a set of alert rules to meet his or her needs.

As described previously, the alert notifications themselves can be provided in any available format supported by the system. Notification may be by e-mail or other electronic messaging as known in the art. By sending appropriate messages to any type of intermediate interface devices, messages such as pages or telephone alerts can also be made. Because the alert notification message and its type are maintained in tables in the alert manager, addition of a new technology is easily made to the alert system. All that is necessary is to provide that a selected message be sent to an appropriate handler from the alert manager, and the message can be sent to the registered user.

While the invention has been particularly shown and described with reference to a preferred embodiment, it will be understood by those skilled in the art that various changes in form and detail may be made therein without departing from the spirit and scope of the invention.

What is claimed is:

1. A system for generating notification messages, comprising:
   a plurality of applications, each application generating event messages;
   an event router in communication with the applications, wherein the router receives the event messages and communicates selected subsets of the event messages to one or more alert managers according to stored registration information specifying, for each of a plurality of sets of event messages, one or more of the alert managers to which the set of event messages should be communicated;
   an alert manager in communication with the router for receiving a first selected subset of the event messages from the event router if the alert manager has registered with the event router to receive the first selected subset of the event messages, the alert manager having registered with the event router by communicating registration information to the event router specifying that the first selected subset of the event messages is to be communicated to the alert manager upon receipt at the event router; and
   a plurality of rules within the alert manager, each rule having an associated notification, each rule registered to act upon selected event messages within the first selected subset of event messages received from the event router;
   upon the alert manager receiving an event message within the first selected subset of event messages received from the event router, the alert manager operable to evaluate all rules registered to act upon the event message and, for all rules registered to act upon the event message that evaluate to True, the alert manager operable to send the associated notifications to one or more users.

2. The system of claim 1, wherein at least one of the plurality of applications comprises:
   a database having data which can be changed; and
   a job that periodically examines the database and generates an event message when selected data items in the database have changed from a previous examination.

3. The system of claim 1, wherein the alert manager comprises:
   a rules portion comprising the rules, the rules comprising conditional statements defining when a notification is to be generated and the one or more users to receive the notification; and
   a notification portion comprising a plurality of pre-selected notification messages to be sent as the notification to the one or more users when the one or more users are determined to receive the notification by the rules portion of the alert manager.

4. The system of claim 1, wherein the alert manager is operable to receive registration information from a user, the registration information defining a portion of the rules within alert manager, the registration information indicating when the user is to receive a notification and the contents of the notification.

5. The system of claim 1, wherein the notification comprises at least one of a message communicated via:
   electronic mail;
   a facsimile machine;
   a telephone; or
   a paging device.

6. The system of claim 1, wherein at least one of the plurality of applications comprises code that explicitly generates event messages to be communicated to the event router.

7. A system for generating notifications, comprising:
   a plurality of applications that each generate event messages;
   a router in communication with the applications, the router operable to receive the event messages;
   a plurality of event handlers in communication with the router, each event handler operable to receive one or more of the event messages received by the router, each event handler communicating registration information to the router specifying which event messages should be communicated by the router to the event handler upon receipt of the event messages at the router; and
   a set of rules within the router, the set of rules being determined by the registration information received from each event handler, each rule being associated with a selected subset of the event messages and comprising at least one conditional statement to be applied to its associated selected subset of the event messages;
   when the router receives an event message, the router is operable to evaluate the one or more rules associated with the event message, and for rules that evaluate to True, forward the event message to the one or more event handlers registered to receive the event message.

8. The system of claim 7, wherein at least one of the plurality of applications comprises:
   a database having data which can be changed; and
   a job that periodically examines the database and generates an event message when selected data items in the database have changed from a previous examination.

9. The system of claim 7, wherein at least one of the event handlers is synchronous, the event messages for which a particular synchronous event handler has registered with the router to receive being forwarded by the router directly to the particular synchronous event handler.

10. The system of claim 9, wherein at least one of the event handlers is asynchronous, the event messages for which a particular asynchronous event handler has registered with the router to receive being forwarded by the router to a queue associated with the particular asynchronous event handler, the event messages being withdrawn from the queue by the particular asynchronous event handler associated with the queue.

11. The system of claim 10, wherein the registration information communicated to the router by each event handler indicates whether the event handler is a synchronous event handler or an asynchronous event handler.

12. The system of claim 11, wherein more than one queue is provided, each queue being associated with at least one asynchronous event handler, the registration information communicated to the router by each asynchronous event handler indicating the appropriate queue to which the router should forward each event message the asynchronous event handler has registered to receive.

13. The system of claim 7, wherein at least one event handler comprises an alert manager operable to communicate an event notification to one or more users registered with the alert manager, the alert manager comprising:
   a rules portion comprising one or more conditions, each condition being associated with one or more of the users registered with the alert manager, the conditions defining when an event notification is to be generated and communicated to each of the one or more users; and
   a notification portion comprising a plurality of preselected notification messages to be sent as the event notification to the one or more users when the one or more users are determined to receive the event notification by the rules portion of the alert manager.

14. The system of claim 13, wherein the event notification is communicated to the user via:
   electronic mail;
   a facsimile machine;
   a telephone; or
   a paging device.

15. The system of claim 7, wherein at least one of the plurality of applications comprises code that explicitly generates event messages to be communicated to the router.

16. A method for generating notifications, comprising:
   generating event messages within one or more applications;
   sending the event messages to a router in communication with the applications, the router operable to receive the event messages;
   within the router, registering event handlers to be notified upon receipt by the router of any of a selected subset of the event messages, each event handler having communicated registration information to the router to register with the router, the registration information specifying the selected subset of the event messages about which the event handler is to be notified;
   within the event handlers, providing a set of rules to be evaluated, each rule being associated with a selected subset of the event messages, each rule having a corresponding action to be executed if the rule evaluates True; and
   when an event handler is notified that the router has received an event message within the selected subset of event messages for which the event handler has registered, evaluating the one or more rules associated with the event message and executing any actions for rules that evaluate True.

17. The method of claim 16, wherein an action to a rule comprises sending a message to a user.

18. The method of claim 16, wherein the application comprises:
   a database having data which can be changed; and
   a job that periodically examines the database and generates an event message when selected data items in the database have changed from a previous examination.

19. The method of claim 16, wherein at least one of the event handlers is synchronous, the notifications that the router has received an event message for which a particular synchronous event handler has registered to receive notification being forwarded by the router directly to the particular synchronous event handler.

20. The method of claim 19, wherein at least one of the event handlers is asynchronous, the notifications that the router has received an event message for which a particular asynchronous event handler has registered to receive notification being forwarded by the router to a queue associated with the particular asynchronous event handler, the notifications being withdrawn from the queue by the particular asynchronous event handler associated with the queue.

21. The method of claim 20, wherein the registration information received at the router from each event handler indicates whether the event handler is a synchronous event handler or an asynchronous event handler.

22. The method of claim 21, comprising providing more than one queue, each queue being associated with at least one asynchronous event handler, the registration information communicated to the router by each asynchronous event handler indicating the appropriate queue to which the router should forward notifications that the router has received an event message for which the asynchronous event handler has registered to receive notification.

23. The method of claim 16, wherein at least one event handler comprises an alert manager, an action for a rule comprising communicating an event notification to one or more users registered with the alert manager, the alert manager comprising:
   a rules portion comprising the set of rules to be evaluated, the set of rules comprising one or more conditions associated with one or more users registered with the alert manager, the conditions defining when an event notification is to be generated and communicated to the one or more users; and
   a notification portion comprising a plurality of preselected notification messages to be sent as the event notification to the one or more users when the one or more users are determined to receive the event notification by the rules portion of the alert manager.

24. The method of claim 23, comprising communicating the event notification to the user via:
   electronic mail;
   a facsimile machine;
   a telephone; or
   a paging device.

25. The method of claim 16, wherein at least one of the plurality of applications comprises code that explicitly generates event messages to be communicated to the event router.

26. Software for generating notifications, the software being embodied in computer readable media and when executed operable to:

generate event messages within one or more applications;

send the event messages to a router in communication with the applications, the router operable to receive the event messages;

within the router, register event handlers to be notified upon receipt by the router of any of a selected subset of the event messages, each event handler having communicated registration information to the router to register with the router, the registration information specifying the selected subset of the event messages about which the event handler is to be notified;

within the event handlers, provide a set of rules to be evaluated, each rule being associated with a selected subset of the event messages, each rule having a corresponding action to be executed if the rule evaluates True; and when an event handler is notified that the router has received an event message within the selected subset of event messages for which the event handler has registered, evaluate the one or more rules associated with the event message and executing any actions for rules that evaluate True.

27. The software of claim 26, wherein an action to a rule comprises sending a message to a user.

28. The software of claim 26, wherein the application comprises:

a database having data which can be changed; and a job that periodically examines the database and generates an event message when selected data items in the database have changed from a previous examination.

29. The software of claim 26, wherein at least one of the event handlers is synchronous, the notifications that the router has received an event message for which a particular synchronous event handler has registered to receive notification being forwarded by the router directly to the particular synchronous event handler.

30. The software of claim 29, wherein at least one of the event handlers is asynchronous, the notifications that the router has received an event message for which a particular asynchronous event handler has registered to receive notification being forwarded by the router to a queue associated with the particular asynchronous event handler, the notification being withdrawn from the queue by the particular asynchronous event handler associated with the queue.

31. The software of claim 30, wherein the registration information received at the router from each event handler indicates whether the event handler is a synchronous event handler or an asynchronous event handler.

32. The software of claim 31, further operable to provide more than one queue, each queue being associated with at least one asynchronous event handler, the registration information communicated to the router by each asynchronous event handler indicating the appropriate queue to which the router should forward notifications that the router has received an event message for which the asynchronous event handler has registered to receive notification.

33. The software of claim 26, wherein at least one event handler comprises an alert manager, an action for a rule comprising communicating an event notification to one or more users registered with the alert manager, the alert manager comprising:

a rules portion comprising the set of rules to be evaluated, the set of rules comprising one or more conditions associated with one or more users registered with the alert manager, the conditions defining when an event notification is to be generated and communicated to the one or more users; and a notification portion comprising a plurality of preselected notification messages to be sent as the event notification to the one or more users when the one or more users are determined to receive the event notification by the rules portion of the alert manager.

34. The software of claim 33, operable to communicate the event notification to the user via:

electronic mail;

a facsimile machine;

a telephone; or a paging device.

35. The software of claim 26, wherein at least one of the plurality of applications comprises code that explicitly generates event messages to be communicated to the event router.

36. A system for generating notifications, comprising:

means for generating event messages within one or more applications;

means for sending the event messages to a router in communication with the applications, the router operable to receive the event messages;

means for, within the router, registering event handlers to be notified upon receipt by the router of any of a selected subset of the event messages, each event handler having communicated registration information to the router to register with the router, the registration information specifying the selected subset of the event messages about which the event handler is to be notified;

means for, within the event handlers, providing a set of rules to be evaluated, each rule being associated with a selected subset of the event messages, each rule having a corresponding action to be executed if the rule evaluates True; and means for, when an event handler is notified that the router has received an event message within the selected subset of event messages for which the event handler has registered, evaluating the one or more rules associated with the event message and executing any actions for rules that evaluate True.

* * * * *

UNITED STATES PATENT AND TRADEMARK OFFICE
CERTIFICATE OF CORRECTION

PATENT NO. : 6,631,363 B1  
APPLICATION NO. : 09/686446  
DATED : October 7, 2003  
INVENTOR(S) : Daniel Brown, William Lance Eason and George A. Thompson Page 1 of 2

It is certified that error appears in the above-identified patent and that said Letters Patent is hereby corrected as shown below:

In the Specification

1. Please amend the paragraph appearing at Column 1, lines 20-25:

As computer systems and data communications become increasingly widespread, more and more users are able to perform a high percentage of their daily tasks over various communication networks. For example, many users are able to obtain key information in a timely manner through the use of interconnected software and hardware systems.

2. Please amend the paragraph appearing at Column 5, lines 44-60:

When the condition of a rule is satisfied, the corresponding notification is then executed and sent to the user 28. Notifications can involve sending a message by a computer communications network to a user's desktop. Notifications can also include sending of a message via phone, pager, fax, or any other desired technique. The contents of the message are defined by the notification portion of the rule. Preferably, a fairly large number of preselected message types will be available, so that a user will be able to select from these messages. The messages can include textual information, and can include as parameters some or all of the context information included with event 64. In the example of FIG. 5, an e-mail message can be sent to the user who registered Rule 1 indicating that a price change for BOAT has occurred, and indicating the new price for the BOAT. A call can be made to a pager at the same time; any desired number of notifications can be made.

3. Please amend the paragraph appearing at Column 7, lines 3-13:

Users gain the ability to select types of events for which they wish to be notified. When these events occur, notification occurs automatically. The user need not periodically review various locations to determine whether anything has happened. Users can select from among types of events, and the applications writers can determine which events to actually make available. For example, a user can register with the alert manager 24 to be notified whenever a new product is introduced by a Signed and Sealed this  
First Day of March, 2016

Michelle K. Lee  
*Director of the United States Patent and Trademark Office* competitor; automatic notifications will be provided whenever this occurs, assuming the events are available as either explicit or implicit events.

4. Please amend Specification at Column 7, lines 22-33:

As described previously, the alert notifications themselves can be provided in any available format supported by the system. Notification may be by e-mail or other electronic messaging as known in the art. By sending appropriate messages to any type of intermediate interface devices, messages such as pages or telephone alerts can also be made. Because the alert notification message and its type are maintained in tables in the alert manager, addition of a new technology is easily made to the alert system. All that is necessary is to provide that a selected message be sent to an appropriate handler from the alert manager, and the message can be sent to the registered user.